US009095775B2

(12) United States Patent  (10) Patent No.: US 9,095,775 B2
Collard et al.  (45) Date of Patent: Aug. 4, 2015

(54) USER INTERFACE AND METHOD OF USER INTERACTION

(71) Applicant: Sony Computer Entertainment Europe Limited, London (GB)

(72) Inventors: Andrew William Collard, London (GB); Danny Charles Murdock, London (GB); Helen Sylvia Grimbly, London (GB)

(73) Assignee: Sony Computer Entertainment Europe Limited (GB)

( * ) Notice: Subject to any disclaimer, the term of this patent is extended or adjusted under 35 U.S.C. 154(b) by 11 days.

(21) Appl. No.: 14/026,398

(22) Filed: Sep. 13, 2013

(65) Prior Publication Data

US 2014/0018172 A1  Jan. 16, 2014

Related U.S. Application Data

(62) Division of application No. 13/384,288, filed as application No. PCT/GB2010/051159 on Jul. 15, 2010, now Pat. No. 8,562,436.

(30) Foreign Application Priority Data

Jul. 17, 2009 (GB) .................................. 0912492.6

(51) Int. Cl.
G06F 17/00 (2006.01)
A63F 13/20 (2014.01)
G06F 3/01 (2006.01)

(52) U.S. Cl.
CPC ................ *A63F 13/06* (2013.01); *G06F 3/011* (2013.01); *A63F 2300/105* (2013.01); *A63F 2300/6045* (2013.01)

(58) Field of Classification Search
CPC ............ A63F 13/06; A63F 2300/6045; A63F 2300/105; G06F 3/011
USPC .......................................................... 463/31
See application file for complete search history.

(56) References Cited

U.S. PATENT DOCUMENTS 5,470,081 A  11/1995 Sato et al.
5,553,864 A   9/1996 Sitrick
(Continued)

OTHER PUBLICATIONS

Pausing in Multiplayer. Relicnews.com. Online. Dec. 25, 2004. Accessed via the Internet. Accessed Nov. 14, 2014. <URL: http://forums.relicnews.com/showthread.php?52232-Pausing-in-Multiplayer>.*

(Continued)

*Primary Examiner* — Paul A D'Agostino
*Assistant Examiner* — Carl V Larsen
(74) *Attorney, Agent, or Firm* — Lerner, David, Littenberg, Krumholz & Mentlik, LLP

(57) ABSTRACT

A method of user interaction with an entertainment device comprises generating an audio-visual output for use with audio-visual reproduction equipment, initiating an audio-visual event as part of the generated audio-visual output, receiving input data from one or more game control devices associated with the entertainment device, analyzing the received input data to evaluate an involuntary physical response by a user interacting with the or each game control device occurring within a predetermined period associated with the initiation of the audio-visual event, and adjusting subsequently generated audio-visual output responsive to the evaluation of the user's involuntary physical response.

14 Claims, 7 Drawing Sheets

(56) References Cited

U.S. PATENT DOCUMENTS

| | | | |
|---|---|---|---|
| 5,974,262 A | | 10/1999 | Fuller et al. |
| 5,990,866 A | | 11/1999 | Yollin |
| 6,005,548 A | * | 12/1999 | Latypov et al. ............... 345/156 |
| 6,450,820 B1 | * | 9/2002 | Palsson et al. ............... 434/236 |
| 6,771,277 B2 | | 8/2004 | Ohba |
| 2007/0149282 A1 | | 6/2007 | Lu et al. |
| 2008/0293491 A1 | | 11/2008 | Wu et al. |
| 2010/0004977 A1 | * | 1/2010 | Marci et al. ..................... 705/10 |
| 2010/0238309 A1 | | 9/2010 | Florea et al. |

OTHER PUBLICATIONS

Warhammer 40,000: Dawn of War. Strategywiki.org. Online. Feb. 20, 2009. Accessed via the Internet. Accessed Nov. 14, 2014. <URL: http://wayback.archive.org/web/20090220204032/http://strategywiki.org/wiki/Warhammer_40%2C000:_Dawn_of_War/Controls>.*

Extended European Search Report for Application No. 13184430 dated Oct. 9, 2013.

Mathew Kumar: "Develop 2009: SCEE's Hirani Reveals PS Eye Facial Recognition, Motion Controller Details", Jul. 16, 2009, XP55082146.

International Search Report and Written Opinion, PCT/GB2010/051159, dated Nov. 30, 2010.

Saari, T. , Ravaja, N. , Turpeinen, M. and Kallinen, K. : "Emotional Regulation System for Emotionally Adapted Games.", Proceedings of Futureplay 2005 Conference, Michigan State University, USA., Oct. 15, 2005 , XP7915860.

\* cited by examiner

USER INTERFACE AND METHOD OF USER INTERACTION

CROSS REFERENCE TO RELATED APPLICATIONS

The present application is a divisional of U.S. patent application Ser. No. 13/384,288, filed on Feb. 27, 2012, which application is a national phase entry under 35 U.S.C. §371 of International Application No. PCT/GB2010/051159, filed Jul. 15, 2010, published in English, which claims the benefit of and priority to GB Patent Application No. 0912492.6, filed Jul. 17, 2009, the entire disclosures of which are hereby incorporated by reference herein.

BACKGROUND OF THE INVENTION

1. Field of the Invention

The present invention relates to a user interface and method of user interaction.

2. Description of the Prior Art

The current generation of videogame consoles include hand-held controllers that comprise microelectromechanical (MEMS) accelerometers and/or gyroscopic sensors, enabling the control of the console through lateral and/or rotational movement of the controller.

Embodiments of the present invention seek to expand the modes the modes of interaction available through such devices.

SUMMARY OF THE INVENTION

In a first aspect, an entertainment device comprises audio-visual generation means operable to generate audio-visual output for use with audio-visual reproduction equipment, a processor operable to initiate an audio-visual event as part of the generated audio-visual output, input means operable to receive input data from one or more user input devices, response evaluation means operable to analyse the input data to evaluate an involuntary physical response by a user interacting with the or each user input device within a predetermined period associated with the initiation of the audio-visual event, wherein the processor is operable to adjust subsequently generated audio-visual output responsive to the evaluation of the user's involuntary physical response.

In a second aspect, a method of user interaction with an entertainment device comprises generating an audio-visual output for use with audio-visual reproduction equipment, initiating an audio-visual event as part of the generated audio-visual output, receiving input data from one or more of user input devices associated with the entertainment device, analysing the received input data to evaluate an involuntary physical response by a user interacting with the or each user input device occurring within a predetermined period associated with the initiation of the audio-visual event, and adjusting subsequently generated audio-visual output responsive to the evaluation of the user's involuntary physical response.

Advantageously, in audio-visual entertainments such as a video game, this enables aspects of the game to be tailored to the emotional response of the user to in-game events as revealed by their involuntary physical reactions.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A user interface and a corresponding method of user interaction are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an audio-visual entertainment system such as a Sony® Playstation 3® console (PS3®) is operably coupled to a display, and game controllers including a camera and microphone, and a hand-held controller that comprises a motion detection mechanism. A user plays a game comprising element designs to induce surprise (typically in the form of fear or shock) in the player. Examples may include a sudden noise or a monster unexpectedly leaping out from behind a door. A common outcome of such a game element is an involuntary physical response from the player, which may take the form of a shout, a change in facial expression, and/or a sudden movement of the head or hands (i.e. involuntary movement of muscles for the limbs/torso/head/face/vocal chords). Consequently, the audio-visual entertainment system may use the inputs available to it to detect and evaluate any involuntary actions on the part of the player in a predetermined period beginning at or just before the instigation of the surprising game element. Thus sudden movements of the head and/or facial expressions of surprise may be detected by use of image analysis of the camera output; shouts or expletives may be detected by use of audio analysis of the microphone output; and sudden hand movements may be detected by use of motion analysis of the controller output. It will be appreciated that detection may be performed independently using any one of these three user interfaces, although correlation between two or more of them improves confidence. Of the three, the most common input is likely to be through the hand-held controller as this is the default input device for most audio-visual entertainment systems. In response the analysed user response(s), the game can then be modified to reflect the player's surprise within the game, and/or to adapt the game environment in an attempt to heighten or alternatively reduce subsequent surprise responses.

Figure 1:
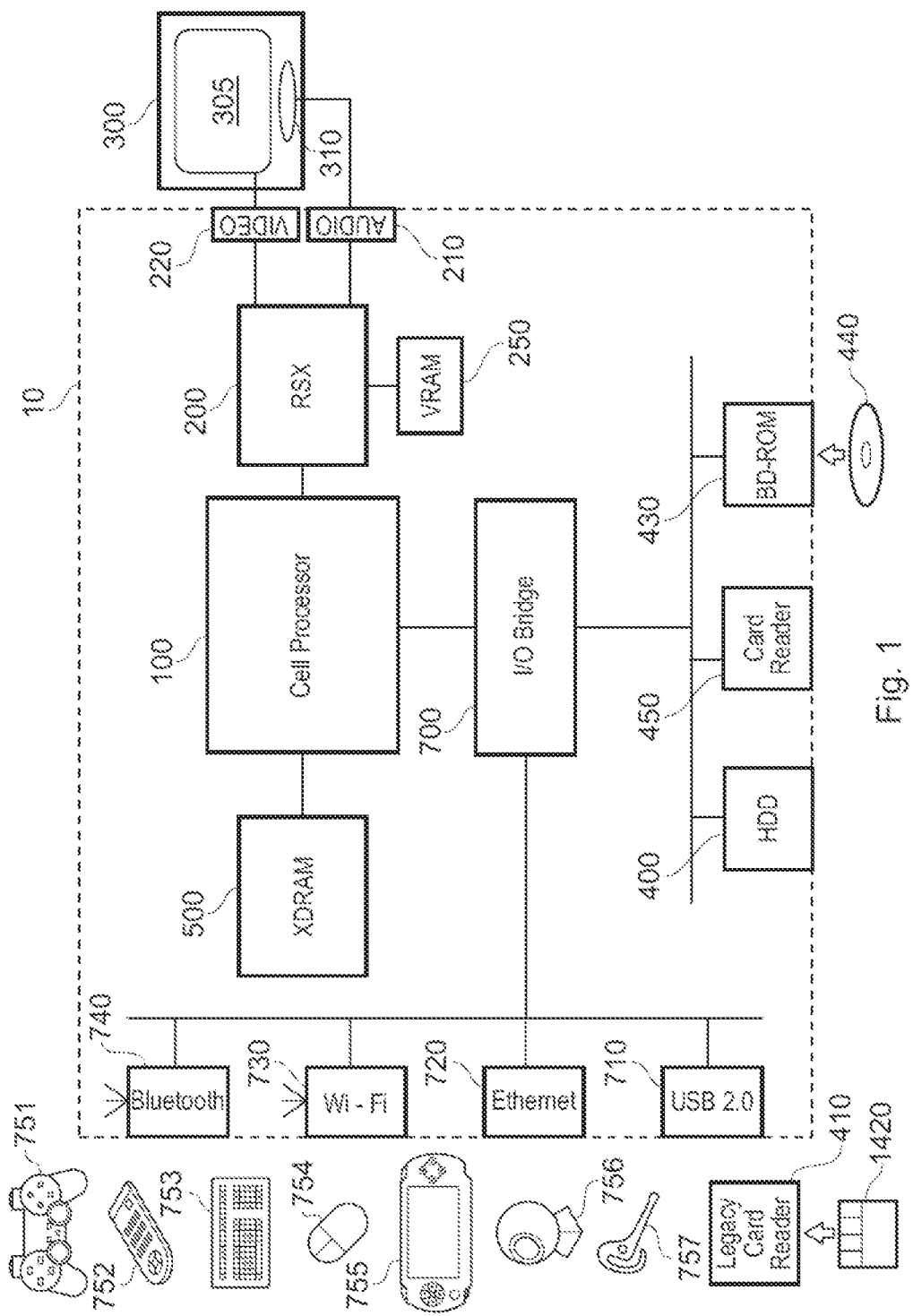
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (CRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device or the Playstation motion controller known as 'Move'® may be used as a controller. In the case of the Playstation Portable device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analog and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
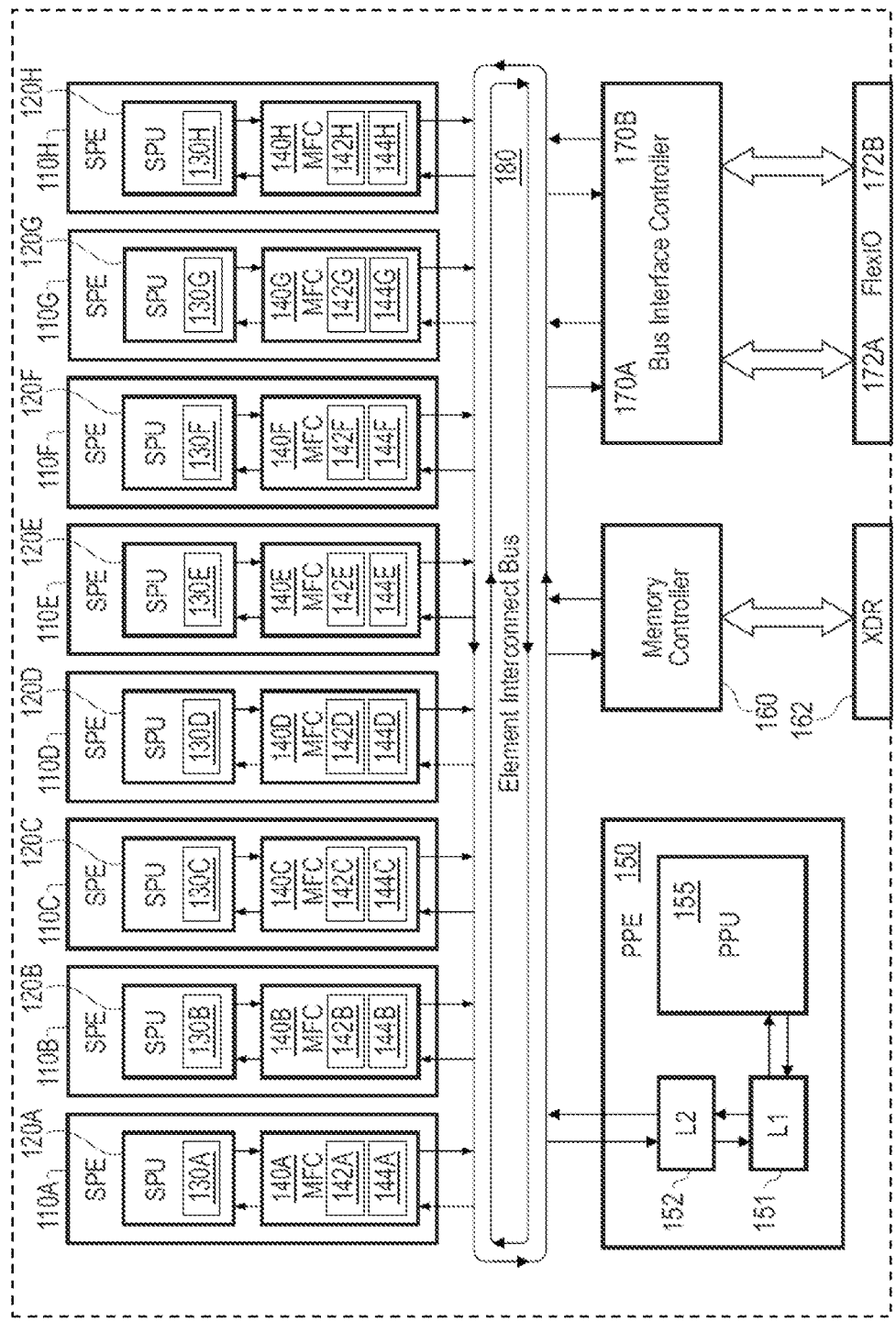
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
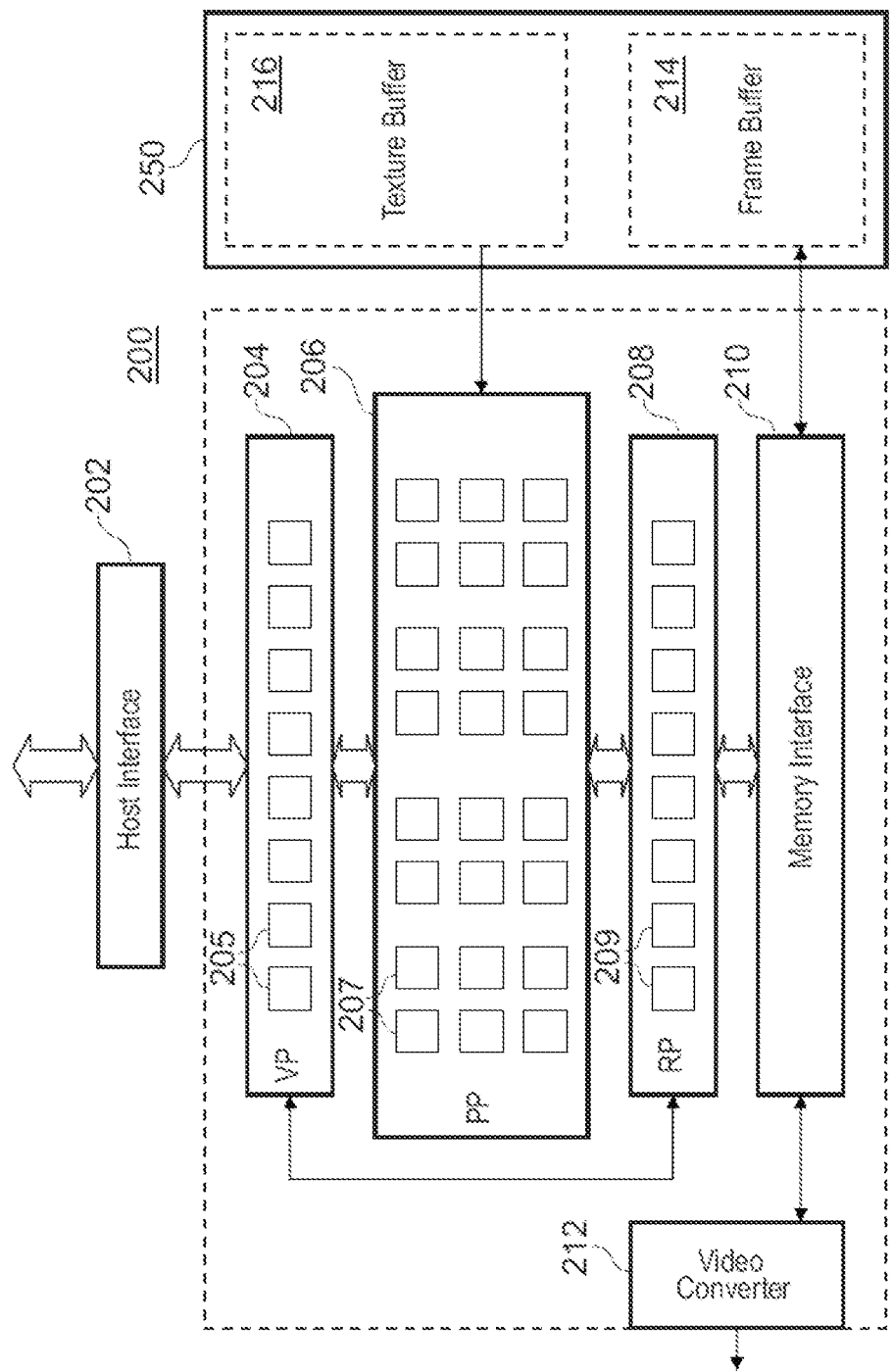
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. As such, it acts as an audio-visual generation means operable to generate audio-visual output for use with audio-visual reproduction equipment. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
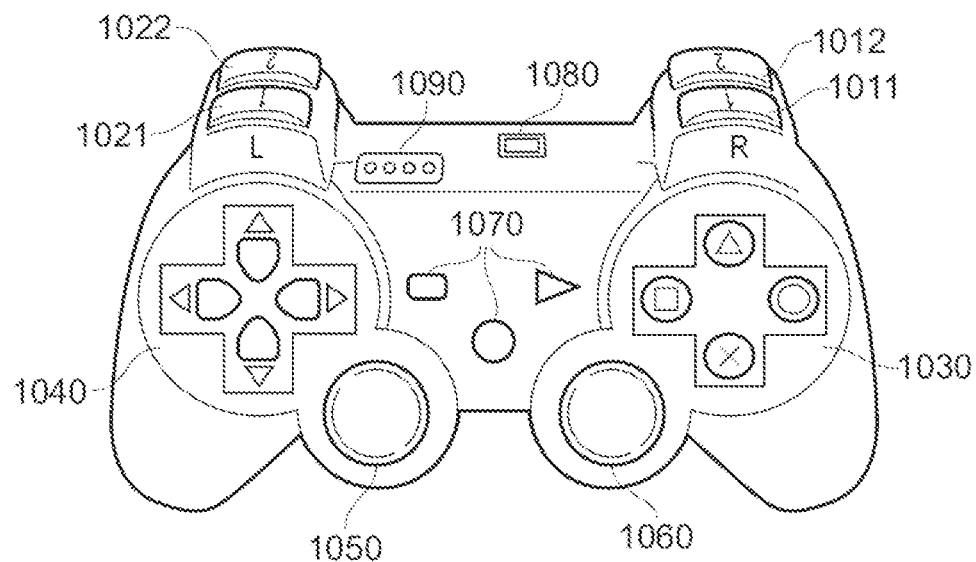
FIG. 4 is a schematic diagram of a Sony® Playstation 3® game controller.

Referring now also to FIG. 4, as an example of a hand-held controller the Playstation 3 game controller 751, known as the SIXAXIS® controller, comprises two joysticks 1050, 1060, two sets of four pressure sensitive buttons 1030, 1040, and two pairs of pressure sensitive trigger buttons, 1011, 1012, 1021, 1022. In addition the central portion of the controller contains three 'system' buttons 1070 that typically access functions of the operating system or current application. The game controller can connect to the PS3 10 via a USB port 1080 to charge the controller's battery.

In addition, the controller contains a MEMS motion detection mechanism, comprising accelerometers (not shown) that detect the extent of translational movement along three axes, and gyroscopes (also not shown) that detect the extent of rotational movement about these axes.

In an embodiment of the present invention, the PS3 is running a videogame that is intended to scare the player. A scary game may comprise so-called 'passive' and 'active' scares, with passive scares generally relating to the mood of the game and including music, lighting and the general environment (e.g. a haunted house or graveyard). By contrast active scares are scripted and/or emergent events that impinge directly upon the game-play, such as sudden noise, lighting or environmental effects such as an explosion, or the sudden and noisy collapse of an object that the player is investigating via their on-screen persona, known as an avatar. Other active scares include the sudden appearance of a monster or similar, or a sudden change in behaviour or a non-player character (NPC), such as suddenly lunging toward the player's avatar. Other active scares will be apparent to the skilled person. Active scares may be tagged as such in order to activate the following process of evaluating the user's response to the scare. This may be a flag or similar entry in the case of a scripted event, a flag associated with an entity whose behaviour is inherently scary, or a monitoring system that determines whether an emergent event may be treated as scary (for example whether the user's proximity to a sudden event, or a rate of change in game volume exceeding a threshold value).

The PS3 or more specifically the Cell processor, operating under the control of the game, is operable to initiate an audio-visual event (i.e. an active scare) as part of the generated audio-visual output of the game, and can then detect whether the user exhibits an involuntary physical response in reaction to the active scare, using input means such as Bluetooth, USB or similar arranged to receive input data from a game controller. As noted previously, the PS3 game controller 751 comprises motion sensors the can be used to detect voluntary physical actions of the user to control a game or other user interface on the PS3.

Figure 5A:
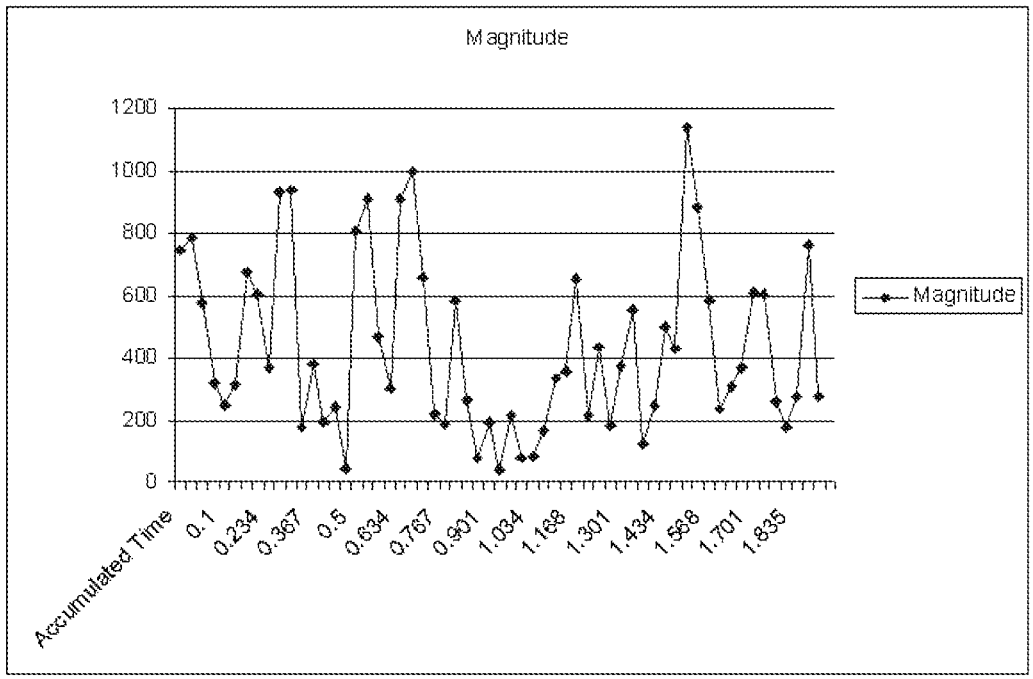
FIGS. 5A and 5B are graphs of input data from a user input device in accordance with an embodiment of the present invention.
Figure 5B:
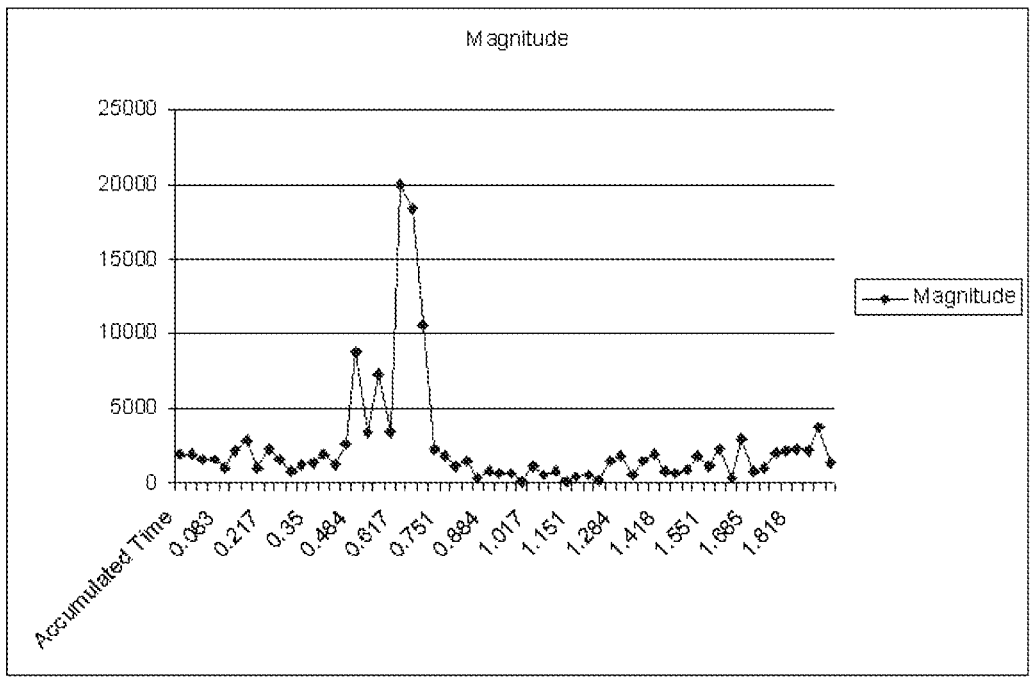

Referring now to FIGS. 5A and 5B, a time history of the sum magnitude of motion of a handheld game controller (in this case, a Sony Playstation motion controller known as 'Move'®—a wand comprising accelerometers and gyroscopic sensors together with a light for optical tracking by a video camera) is shown in FIG. 5A. Time proceeds along the x-axis of the graph whilst the magnitude is shown on the y-axis of the graph. Axis scales are arbitrary. The time history in FIG. 5A was taken during a calm period in a game and can be considered to represent a noise floor or baseline response caused by normal movement of the player, for example when making normal voluntary movements of the controller.

In FIG. 5B, a similar time history of the sum magnitude of motion of the handheld controller is shown that encompasses an active scare event. As can be seen in this figure there is a large overall motion of the controller due to an involuntary surprise reaction by the player to the active scare, taking the form of a muscular spasm or similar large physical response that transferred motion to the controller.

Such a large movement may be detected as an involuntary reaction, as opposed to a voluntary control action, by exceeding a threshold that is either an absolute value that may be empirically determined, or is relative to a time-averaged estimate of a noise floor of the type illustrated in FIG. 5A, which may comprise user inaction or simply more controlled and hence less intense voluntary control actions. For example, such an average may optionally be performed by the PS3 just prior to the instigation of the active scare for a period of time sufficient to determine a reliable estimate for the noise floor. An involuntary surprise/scare response may then be determined to have occurred if the magnitude of input exceeds the noise floor by a certain percentage or multiple, or by a number of standard deviations. Optionally a minimum duration above this threshold may also be required. In this way, the PS3 can distinguish between voluntary and involuntary physical actions detected using the same game controller.

If the magnitude of input exceeds the minimum threshold as described above then the actual value may be used as an indicator of the level of surprise experienced by the player.

The level of surprise (scare) may be crudely characterised as:

i. not very scared;
  ii. scared; and
  iii. terrified.

The first level of 'not very scared' may be determined if the magnitude of input exceeds the minimum threshold but does not exceed a second, higher 'scared' threshold. This level may also be inferred if there is a failure to detect any involuntary response above the noise floor of the controller input (i.e. no response exceeds the minimum threshold). In either case the user's response may be taken as an indication that the active scare was not scary enough. Consequently, in an embodiment of the present invention the game may be altered to increase the relative scare potential (i.e. the intensity) of future active scares—for example by making unexpected noises louder, or waiting until the player's avatar is closer before a monster leaps out at it. Similarly any passive scares may also be increased in intensity to heighten tension, for example by reducing the in-game lighting levels, making in-game ammunition or health packs more scarce, and/or altering the music. Thus the Cell processor is operable to subsequently adjust generated audio-visual output of the game responsive to the evaluation of the user's involuntary physical response, as categorised by the threshold.

The relative increase in intensity of future scares (for example the change in volume, or triggering distance) may be proportional to the shortfall between the measured magnitude of input and the 'scared' threshold. Again, this second 'scared' threshold may be an absolute figure or relative to a measured noise floor.

It will be appreciated that increases in potential scares may be subject to absolute limits; for example limits on volume levels within the overall audio mix, or limits on how close a triggering distance may be before it affects the user's ability to properly tackle the monster, etc.

Alternatively or in addition, the user's avatar and non-player characters it encounters may respond in a manner appropriate to a fearless character; for example friendly non-player characters may run to the player's avatar for protection, and the player's avatar may perform in-game actions more competently (e.g. deal more hit points in a fight, or open a locked door more quickly). Likewise the player's avatar may display a fearless expression and fearless mannerisms.

The second level of 'scared' may be determined if the magnitude of input exceeds the second, higher 'scared' threshold but does not exceed a third, highest 'terrified' threshold. In this case the user's response may be taken as an indication that the scare level is roughly correct, in the sense that the player is roughly as scared as the game's designers want them to be.

As outlined previously, in an embodiment of the present invention the game may be further altered to adjust the relative scare potential or intensity of future active scares, but in this case the adjustment may be small and, depending on whether the user's response is below or above a midpoint value lying between the second and third threshold values, may increase or decrease the relative intensity of scare accordingly.

Again the increase or decrease in potential scare may be subject to an absolute limit.

Alternatively or in addition, the user's avatar and non-player characters it encounters may respond in a manner appropriate to a fearful character; for example if an enemy is encountered, friendly non-player characters may run away from the player's avatar to seek protection elsewhere or with each other, and the player's avatar may perform in-game actions less competently (e.g. dealing fewer hit points in a fight, or dropping a torch, causing the player's avatar to be temporarily plunged into darkness). Likewise the player's avatar may display a scared expression and fearful mannerisms, such as looking over their shoulder.

Similarly other feedback may be provided in the form of rumble in the controller or a similar suitable change in the operation of any other peripheral associated with the PS3.

The third level of 'terrified' may be determined if the magnitude of input exceeds the third, highest 'terrified' threshold.

In this case the user's response may be taken as an indication that the scare level is too high. Consequently, in an embodiment of the present invention the game may be altered to decrease the relative scare potential (intensity) of future active scares—for example making unexpected noises quieter or causing a monster to leap out of concealment further from the player's avatar. Similarly any passive scares may also be decreased to reduce tension, for example by increasing the in-game lighting levels, making in-game ammunition or health packs more available, and/or altering the music.

The relative decrease of scare intensity (for example the change in volume, or triggering distance) may be proportional to the extent by which the measured magnitude of the input exceeds the 'terrified' threshold.

It will be appreciated that decreases in potential scares may be subject to absolute limits; for example limits on volume levels within the overall audio mix, or limits on how far a triggering distance may be before it affects the rules governing a monster's interaction with the user, etc.

Alternatively or in addition, the user's avatar and non-player characters it encounters may respond in a manner appropriate to a terrified character; for example friendly non-player characters may avoid the player's avatar or comment that the player is afraid. Meanwhile the player's avatar may perform in-game actions less competently, and/or the player may temporarily lose control of the avatar; for example the avatar may cower in front of a monster for a period of time, or run away by a certain distance or to a certain location, before control is passed back to the player. Likewise the player's avatar may display a terrified expression and terrified mannerisms, such as jumping at shadows.

Similarly other feedback may be provided in the form of rumble in the controller or the activation or a change in lights on the controller.

Alternatively, in an embodiment of the present invention there is an absolute or relative value that may be characterised as 'properly scared', above which the intensity of scares are proportionately reduced and below which the intensity of scares are proportionately increased in ways such as those described previously herein, again subject to any limits imposed by the game's designers. In this case the in-game adjustments, and player avatar characterisations and other game-driven responses described above for 'not very scared', 'scared' and 'terrified' are appropriately distributed along a scale with 'properly scared' in the middle, corresponding, for example, to the mid-point value between the 'scared' and 'terrified' threshold values noted above.

It will be appreciated that the above described adaptations to a game are for illustrative purposes only and are non-limiting. More generally, a game may adapt to increase or decrease the intensity of a scare in response to an estimated level of fear in the player based upon an evaluation of their involuntary response to such scares. Alternatively or in addition characteristics of the player's avatar and/or other non-player characters can also be adapted in response to the user's estimated level of fear in a manner appropriate to the context of the game.

It will be appreciated that different active scares may have different absolute or relative thresholds set for them by the game's designers, or they may use globally set thresholds.

Similarly it will be appreciated that different active scares may be adjusted separately in response to the user's reactions, or related groups of scares (e.g. monsters, noises etc) may be adjusted on a group basis.

Similarly it will be appreciated that in principle only one of the motion detection outputs from the controller need be used (in this case preferably corresponding to vertical movement), but as more of the motion detection outputs are used then a more complete range of motion can be captured from the user.

It will also be appreciated that independently of any absolute or relative thresholds, in an embodiment of the present invention if involuntary physical responses of a user result in inputs indicative that the user input device (e.g. the controller) is at risk of damage to itself or causing injury to others, then the game will similarly reduce the effective scare level.

Further it will also be appreciated that the game control device is not limited to the examples of the SixAxis controller or the Sony Playstation Motion Controller wand, but is applicable to any controller or controller system with a suitable motion sensing capability, either internal in the form of accelerometers and/or gyroscopic sensors, or external in the form of a camera for tracking a feature of the device.

Finally it will be appreciated that the above system of fear detection is not limited to movement magnitude detection and thresholding; alternatively or in addition, velocity or acceleration levels and corresponding low, medium and high thresholds may be used. For example, muscular reactions in response to shock are likely to exhibit greater levels of acceleration than those associated with intentional voluntary actions, often regardless of the corresponding magnitude of movement, potentially making such involuntary movements more easily distinguishable as changes in acceleration rather than displacement. It will be appreciated that a particular advantage of this embodiment of the present invention is that involuntary actions are detected using the same game controller device and sensors that are normally used to detect voluntary actions of the user, and hence fear levels can be detected and categorised using the standard control equipment already in use during play and that is shipped with the PS3, without resorting to additional potentially expensive, uncomfortable, invasive or (for multiplayer games), unhygienic biofeedback sensor systems such as detectors of pulse rate or galvanic skin response.

Alternatively or in addition to measuring the input from the motion detection mechanism of the controller, input may be measured from other commonly used game controllers, such as a microphone or video camera. Typically the microphone will be physically associated with the video camera, but this is not necessary.

For the microphone, the generated input may simply constitute a measure of volume, corrected for the known current audio output of the game itself in a manner similar to active noise cancellation. For example, during a quiet period of the game or during a calibration exercise, the PS3 can use autocorrelation to determine one or more delay paths and attenuation levels between loudspeakers coupled to the game and the microphone, and then use this estimate to deleting a synthesised version of the current audio output from the microphone's audio signal so as to isolate additional sounds attributable to the user.

The measure of volume may then be used in a similar manner to the measure of motion described above, with, for example, the establishment of a noise floor with respect to normal voluntary voice commands or voice chat issued by the user to the microphone, and the use of one or more absolute or relative thresholds or values to evaluate how scared the user is.

Optionally, alternatively or in addition voice recognition may be used to determine whether the user said anything that may indicate surprise, shock, fear, etc. Thus, for example, a weighting may be given to effectively increase the volume of a user's utterance if that utterance was a recognised expletive.

Alternatively or in addition to measuring the input from the motion detection mechanism of the controller or the microphone, input may be measured from the video camera.

In an embodiment of the present invention, the input allows measurement the extent of vertical motion of the user's head; i.e. whether the user jerked their head in reaction to the active scare, using image analysis techniques known in the art. Such motion may be absolute, or relative to the size of the user's head as captured in the video image so as to compensate for the unpredictable distance of the user from the camera.

In another embodiment, the input allows measurement of the acceleration of a glowing ball affixed to the Playstation motion controller.

In either case, again the measure of such motion may then be used in a similar manner to the measure of controller motion described above, with, for example, the establishment of a noise floor with respect to voluntary gesture commands used with the camera, and the use of one or more absolute or relative thresholds or values to evaluate how scared the user is.

Optionally, alternatively or in addition facial expression recognition using known techniques may be used to determine whether the user was not very scared, scared or terrified; the game may then react in a similar manner to that outlined previously for these categories of reaction.

Figure 6A:
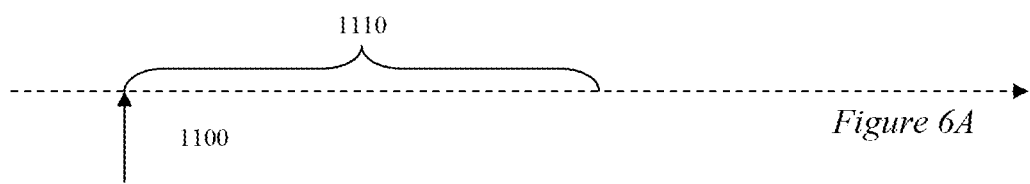
FIGS. 6A-6C are schematic diagrams of timing strategies in accordance with an embodiment of the present invention.
Figure 6B:
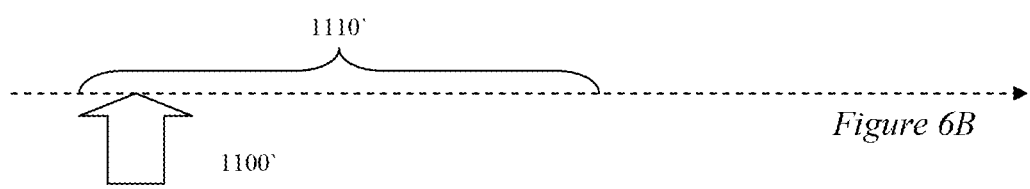
Figure 6C:
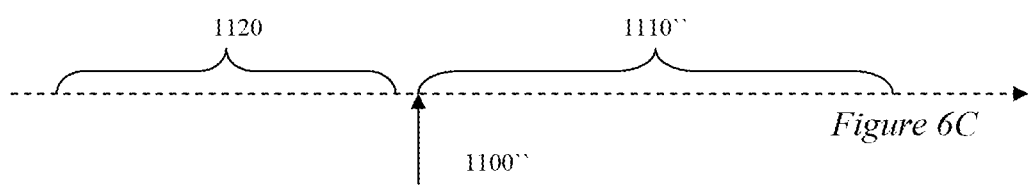

Referring now to FIGS. 6A, 6B and 6C, in an embodiment of the present invention the above measurement or measurements are conducted within a typically brief period associated with the active scare; for example a period of two seconds beginning coincident with the beginning of the active scare.

Such a typical period is shown in FIG. 6A, where a momentary scare event 1100 is followed by a measurement period 1110. An arbitrary time scale is used on the x-axis.

The measurement period provides time for the scare to occur, a reaction delay time on the part of the player, and for the physical manifestation of their involuntary response.

Outside this measurement period, in an embodiment of the present invention measurements are not analysed to detect any involuntary scare response on the part of the user. This reduces the scope for false-positives that may otherwise occur if, for example, the user drops the game controller, nods their head or calls out to a friend whilst playing the game.

Alternatively or in addition, as seen in FIG. 6B an active scare may take a finite period of time to unfold (represented by the broad arrow 1100') and the measurement period may encompass the whole scare event or even slightly precede it.

Alternatively or in addition, as seen in FIG. 6C, prior to an active scare event 1100", a calibration or noise level estimation period 1120 may be used to estimate what background movement or sound levels (as applicable) are occurring just prior to the active scare event, to enable the determination of a measurement noise floor and subsequently relative scare thresholds. Optionally such an estimate may contribute to a user-specific long-term estimate derived over the course of one or more gaming sessions and used in preference as the basis for relative thresholds as described herein.

Alternatively or in addition, in an embodiment of the present invention, measurements are evaluated continuously or over additional periods to determine whether the user is scared by events or features of the game not anticipated as such by the game's designers. For example a user may find an aspect of the ambient environment scary and react to it. Following each such unanticipated reaction from the user, the game can record what environmental factors were present, and over successive reactions, evaluate common elements. These elements may then be increased or decreased within the game depending on the user's currently evaluated level of fear.

It will be understood that typically the Cell processor operates as the response evaluation means operable to analyse the input data to evaluate an involuntary physical response by a user interacting with the or each game control device within a predetermined period associated with the initiation of the audio-visual event.

An evaluation of the user's involuntary response to a surprise event, including as applicable their relative or absolute increase in movement in either the controller or their head, body, or limbs, and/or their vocal and facial responses, together with typical reaction times, may be initially determined via a further separate calibration phase.

Such a calibration phase may be overtly portrayed as such, for example using a loud tone as the surprise event within a neutral context outside the game proper, or may be part of the game itself, such as a tutorial or introductory mode; for example where the player is treated as a so-called 'rookie' and subjected to various training tests that include a sequence of active scare events. Measurement data from the scare events can be used to calibrate, normalise and/or (in the instance of facial expression recognition) optionally train the game to achieve the desired level of involuntary scare response from the player prior to playing the game proper. Similarly measurement data from the various training tests between events and in calm periods may be used to generate a noise-floor of baseline estimates of normal user motion, and so calibrate the thresholds for the user's intensity of voluntary physical motion when controlling the game, which may be of use where estimates of such motion are not performed immediately prior to an active scare event (for example where such events are emergent rather than scripted, as described previously).

In an embodiment of the present invention, the above system of game adaptation to involuntary user responses can be overridden in several ways.

Firstly, the user may simply be allowed to disable the feature, and instead simply use a 'scare rating' slider; similarly the scare level may be set or biased by the player's age.

Secondly, any one of the available inputs may be disabled; for example the use of facial expressions or audio cues may be disabled whilst head and controller motion are still used.

Notably inputs may also be disabled automatically during or following the calibration phase; for example if there is a poor correlation between the scare and any audio cues, or between facial expressions and other indicators of involuntary response from the player, then these may be disabled by the game. Thus more generally any input type from which evaluations of the user's involuntary response diverges significantly from a consensus of evaluations may be discounted and/or disabled.

Alternatively or in addition to overriding inputs, the games responses to the user may also be overridden as follows;

Firstly, adjustments to active and passive scare levels may be disabled, leaving only changes to the user's avatar, and vice-versa.

Notably, adjustments to active and passive scare levels may be disabled automatically during a multiplayer game, where several players, with potentially different levels of involuntary response, will share the same active and passive scares. In this case the scares may return to a default level. However, optionally the user's avatar may still reflect their scare level.

It will be understood that reference herein to the player's avatar also encompasses as applicable the player's point of view in the case of first-person (rather than third-person) game styles.

It will also be appreciated that the above techniques, whilst described primarily in relation to scares within a game, may in principle be used to evaluate other involuntary physical responses to other events. For example in a game for small children, laughter and/or smiles in response to an amusing event may be used to increase the frequency of such events and/or exaggerate them in future, in order to modify a game to provide greater amusement. In this case, rather than levels of fear or a 'properly scared' target response, levels of happiness or a 'properly happy' target response may be similarly used. Again, the sensors used to detect these responses are the same sensors being used for voluntary game control actions within the game controllers; motion sensors, microphones and/or video cameras.

Likewise, the above techniques may be used to adjust the properties of a visualisation provided by a music playing application, so as to either encourage or discourage physical reactions, for example depending on the genre of the music (rock or classical, for example).

Similarly the above techniques may be used to adjust the properties of a film being played by the entertainment device, for example compressing the audio dynamic range if the viewer is overly surprised by loud sounds. Again this may also be responsive to the nature of the film, for example being overridden when playing a horror film.

Figure 7:
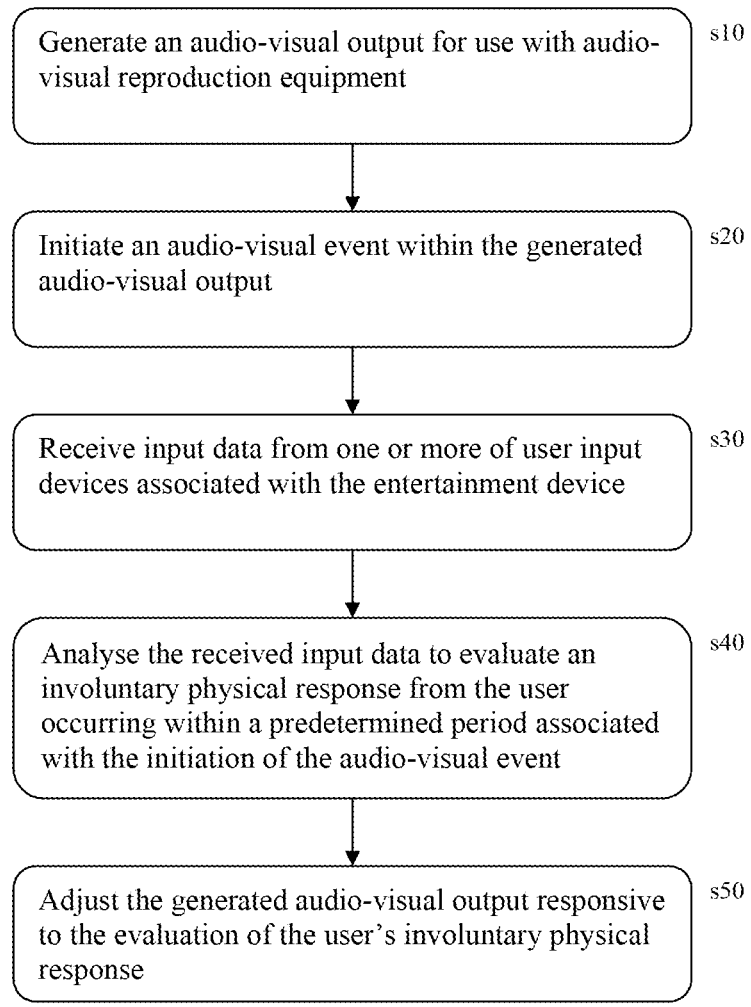
FIG. 7 is a flow diagram of a method of user interaction in accordance with an embodiment of the present invention.

Referring now to FIG. 7, a method of user interaction with an entertainment device comprises:

in a first step, generating (s10) an audio-visual output for use with audio-visual reproduction equipment;

in a second step, initiating (s20) an audio-visual event as part of the generated audio-visual output;

in a third step, receiving (s30) input data from one or more game control devices associated with the entertainment device;

in a fourth step, analysing (s40) the received input data to evaluate an involuntary physical response from the user occurring within a predetermined period associated with the initiation of the audio-visual event; and in a fifth step, adjusting (s50) the generated audio-visual output responsive to the evaluation of the user's involuntary physical response.

It will be apparent to a person skilled in the art that variations in the above method corresponding to operation of the various embodiments of the apparatus as described and claimed herein are considered within the scope of the present invention, including but not limited to:

adjusting environmental elements of a game (passive scares) to increase or decrease their intensity (i.e. the extent to which they contribute to the scariness or tension of the game) responsive to the evaluation of the user's involuntary physical response;

adjusting parameters of the active scare events to change their intensity, for example by changing the volume or a triggering distance to an event responsive to the evaluation of the user's involuntary physical response;

subject to absolute limits;

adjusting the appearance and/or behaviour of the player's avatar and/or of non-player characters responsive to the evaluation of the user's involuntary physical response;

adjusting the behaviour of a hardware component of the system, for example controller rumble or lights, responsive to the evaluation of the user's involuntary physical response;

making these adjustments according to categorisations associated with one or more thresholds;

and optionally proportional to the difference between the evaluated user's involuntary response and a relevant threshold;

making these adjustments proportional to the difference between the evaluated user's involuntary response and a target response level;

such thresholds and/or target response levels may be absolute or relative to a noise floor, and/or set during a calibration phase;

overriding or disabling input from one or more possible game controllers;

overriding or disabling adjustments to one or more aspects of the game (such as those outlined above);

in particular, active and passive scares during multi-player games; and analysing whether events within the game that are not specifically intended as active scares also cause an involuntary reaction in the player and adjusting them in a similar manner.

It will be appreciated that the above techniques may be incorporated within a particular game, or may be supplied by the operating system or firmware of the entertainment device, for example as part of the device's input/output application programming interface.

Consequently, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

The invention claimed is:

1. An entertainment device, comprising:
    audio-visual generation means operable to generate audio-visual output for use with audio-visual reproduction equipment;
    a processor operable to initiate a scary audio-visual event as part of the generated audio-visual output;
    an input operable to receive input video data from a video camera game controller; and
    response evaluation means operable to analyse the input video data to detect, with reference to a predetermined threshold, between normal user actions comprising voluntary motions and an involuntary physical motion by a user interacting with the video camera game controller, in which input data corresponding to voluntary physical motions do not exceed the predetermined threshold, while input data corresponding to involuntary physical motions do exceed the predetermined threshold;
    the response evaluation means being further operable to detect an involuntary physical motion within a predetermined period associated with the initiation of the scary audio-visual event; and wherein
    the processor is operable to subsequently adjust generated audio-visual output responsive to the evaluation of the user's involuntary physical motion.

2. An entertainment device according to claim 1, further comprising a microphone.

3. An entertainment device according to claim 1, in which:
    if an evaluation of the user's involuntary physical motion characterises it as too small, the processor is arranged to increase the intensity of a subsequently initiated audio-visual event; and
    if the evaluation of the user's involuntary physical motion characterises it as too large, the processor is arranged to decrease the intensity of a subsequently initiated audio-visual event.

4. An entertainment device according to claim 1, in which the generated audio-visual output relates to a video game and the audio-visual events are events within the video game.

5. An entertainment device according to claim 4, in which the processor is operable to adjust background environmental aspects of the game responsive to the evaluation of the user's involuntary physical motion.

6. An entertainment device according to claim 5, in which the processor is operable to not make one or more adjustments to the generated audio-visual output when the game is played in multiplayer mode.

7. An entertainment device according to claim 4, in which the processor is operable to adjust one or more characteristics of one or more in-game characters responsive to the evaluation of the user's involuntary physical motion.

8. An entertainment device according to claim 4, in which the processor is operable to adjust the operation of one or more peripheral devices associated with the entertainment device responsive to the evaluation of the user's involuntary physical motion.

9. An entertainment device according to claim 1, in which the processor is operable to adjust the generated audio-visual output responsive to an evaluation of the user's involuntary physical motion with respect to one or more categories, the one or more categories corresponding to one or more threshold values of involuntary physical motion.

10. An entertainment device according to claim 9 in which the one or more threshold values of involuntary physical motion are one or more selected from the list consisting of:
   i. a predetermined absolute value;
   ii. an absolute value derived during a calibration test;
   iii. a value derived relative to a baseline value of involuntary physical motion measured prior to the initiated audio-visual event; and
   iv. a value derived relative to a baseline value of involuntary physical motion measured during a calibration test.

11. An entertainment device according to claim 1, in which the processor is operable to adjust the generated audio-visual output responsive to an evaluation of the user's involuntary physical motion with respect to a target value, wherein the target value is one selected from the list consisting of:
   i. a predetermined absolute value;
   ii. an absolute value derived during a calibration test;
   iii. a value derived relative to a baseline value of involuntary physical motion measured prior to the initiated audio-visual event; and
   iv. a value derived relative to a baseline value of involuntary physical motion measured during a calibration test.

12. An entertainment device according to claim 1, in which the processor is operable to correlate a further audio-visual event with evaluated involuntary physical motions of the user, and adjust one or more characteristics of subsequent instances of the audio-visual event responsive to evaluated involuntary physical motions of the user.

13. A method of user interaction with an entertainment device, comprising the steps of:
   generating an audio-visual output for use with audio-visual reproduction equipment;
   initiating a scary audio-visual event as part of the generated audio-visual output;
   receiving input video data from a video camera game controller that is associated with the entertainment device;
   analysing the received input data to detect, with reference to a predetermined threshold, between normal user actions comprising voluntary motions and an involuntary physical motion by a user interacting with the video camera game controller that occurs within a predetermined period associated with the initiation of the scary audio-visual event, in which input data corresponding to voluntary physical motions do not exceed the predetermined threshold, while input data corresponding to involuntary physical motions do exceed the predetermined threshold; and
   subsequently adjusting generated audio-visual output responsive to the evaluation of the user's involuntary physical motion.

14. A tangible, non-transitory computer program product on which computer readable instructions of a computer program are stored, the instructions, when executed by a processor, cause the processor to perform a method of user interaction with an entertainment device according to claim 13.

* * * * *